US005739593A

United States Patent [19]

Hayama

[11] Patent Number: 5,739,593

[45] Date of Patent: Apr. 14, 1998

[54] VOLTAGE SOURCE CIRCUIT FOR GENERATING A PLURALITY OF VALUES OF VOLTAGES

[75] Inventor: Hiroshi Hayama, Tokyo, Japan

[73] Assignee: NEC Corporation, Tokyo, Japan

[21] Appl. No.: 753,425

[22] Filed: Nov. 25, 1996

Related U.S. Application Data

[63] Continuation of Ser. No. 347,075, Nov. 23, 1994.

[30] Foreign Application Priority Data

Nov. 29, 1993 [JP] Japan .................................... 5-297167

[51] Int. Cl.[6] .................................................. H02J 1/10

[52] U.S. Cl. .......................... 307/43; 307/125; 307/130; 327/538

[58] Field of Search ................................ 307/13, 18, 28, 307/29, 43, 85, 86, 87, 112, 113, 125, 110; 320/14, 22, 39; 327/530, 538, 543

[56] References Cited

U.S. PATENT DOCUMENTS

| | | | |
|---|---|---|---|
| 4,864,162 | 9/1989 | Maoz | 327/581 |
| 4,924,169 | 5/1990 | Shifflet et al. | 320/21 |
| 5,191,277 | 3/1993 | Ishikura et al. | 320/22 |
| 5,362,988 | 11/1994 | Hellums | 327/543 |
| 5,448,190 | 9/1995 | Etoh | 327/103 |

FOREIGN PATENT DOCUMENTS

| | | |
|---|---|---|
| 61-116933 | 6/1986 | Japan . |
| 2228714 | 9/1990 | Japan . |
| 3-264922 | 11/1991 | Japan . |
| 3-274089 | 12/1991 | Japan . |
| 3-274090 | 12/1991 | Japan . |
| 4-129265 | 4/1992 | Japan . |
| 4-204689 | 7/1992 | Japan . |
| 4-82188 | 12/1992 | Japan . |
| 5-24670 | 4/1993 | Japan . |

*Primary Examiner*—William M. Shoop, Jr.
*Assistant Examiner*—Jonathan S. Kaplan
*Attorney, Agent, or Firm*—Whitham, Curtis & Whitham

[57] ABSTRACT n (an integer of two or more) resistors are serially connected between a first terminal to which a first voltage is applied and a second terminal to which a second voltage is applied. Gates of the (n+1) MOS transistors are connected to the corresponding one among the first terminal, the second terminal, and nodes between n resistors. The sources of the (n+1) MOS transistors provide (n+1) different output voltages.

6 Claims, 8 Drawing Sheets

VOLTAGE SOURCE CIRCUIT FOR GENERATING A PLURALITY OF VALUES OF VOLTAGES

This is a continuation of U.S. patent application Ser. No. 08/347,075, filed Nov. 23, 1994.

BACKGROUND OF THE INVENTION

1. Field of the Invention

The present invention relates to a multivalued voltage source circuit.

2. Related Art

An integrated circuit producing a plurality of voltages has been widely used for driving/controlling various equipment. Particularly, in recent years, there is an increased demand for a multivalued voltage source circuit in an integrated circuit for driving a display element such as a liquid crystal display, electroluminescent display and a plasma display.

The following methods for producing a multivalued voltage are known.

If the number of voltages produced by an integrated circuit is small, a method has been adopted for applying externally output voltages corresponding of the number to the integrated circuits. This method is described in Japanese Laid Open Patent Application Publication (Kokai) No. 4-204689 (hereinafter referred to as a first publication).

If the integrated circuit produces a number of different voltages, a voltage is applied to series-connected registers so that voltages divided by the resistor values are produced from each node between resistors. This method is described in Japanese Laid Open Patent Application Publication No. 3-264922 (hereinafter referred to as a second publication).

According the method for directly producing the resistor-divided voltages, the output impedance is not constant. For this reason, a method has been used for converting the impedances of the divided voltages by operational amplifiers to produce a number of voltages whose output impedances are constant. This method is described in Japanese Laid Open Patent Application Publication No. 3-274089 (hereinafter referred to as a third publication) and Japanese Laid Open Patent Application Publication No. 3-274090 (hereinafter referred to as a fourth publication).

On the other hand, for a semiconductor integrated circuit, a method is known for producing a voltage lower than a voltage value of an external voltage source applied to the semiconductor integrated circuit by a voltage dropper utilizing a threshold voltage of a MOS transistor. This method is described in Japanese Examined Patent Application Publication (Kokoku) No. 5-24670 (hereinafter, referred to as a fifth publication). Japanese Laid Open Patent Application Publication No. 61-116933 (hereinafter referred to as a sixth publication), Japanese Examined Patent Application Publication No. 4-82188 (hereinafter referred to as a seventh publication) and Japanese Laid Open Patent Application Publication No. 4-129265 (hereinafter referred to as an eighth publication).

However, if the method described in the first publication is to be implemented by a monolithic integrated circuit, a plurality of external voltages must be supplied to the monolithic integrated circuit.

Also, even if the method described in the second publication is implemented by using the monolithic integrated circuit, the problem that the output impedance is not constant cannot be solved.

Furthermore, if the methods described in the third and fourth publications are implemented by the monolithic integrated circuit, the number of operational amplifiers is increased in accordance with the number of voltages to be output, resulting in an increase of the dissipated power and the occupied area. For this reason, the monolithic integration is difficult.

On the other hand, according to the inventions described in the fifth to eighth publications, a problem is posed that a number of different voltages cannot be generated.

SUMMARY OF THE INVENTION

The present invention has been developed in view of the above drawbacks and its object is to provide a voltage source circuit which is capable of producing a number of voltages with a constant output impedance and adapted to be implemented by an integrated circuit.

In order to achieve the above object, a multivalued voltage source circuit according to the present invention comprises: a first terminal; a second terminal; n resistors (n is an integer of two or more) for dividing a voltage applied between the first and second terminals; and (n+1) MOS transistors drains of which are commonly connected, gates of which are connected in one-to-one correspondence to the first terminal, the second terminal, and (n−1) nodes of the n resistors, and sources of which produce output voltages.

DETAILED DESCRIPTION OF THE PREFERRED EMBODIMENTS

Figure 1:
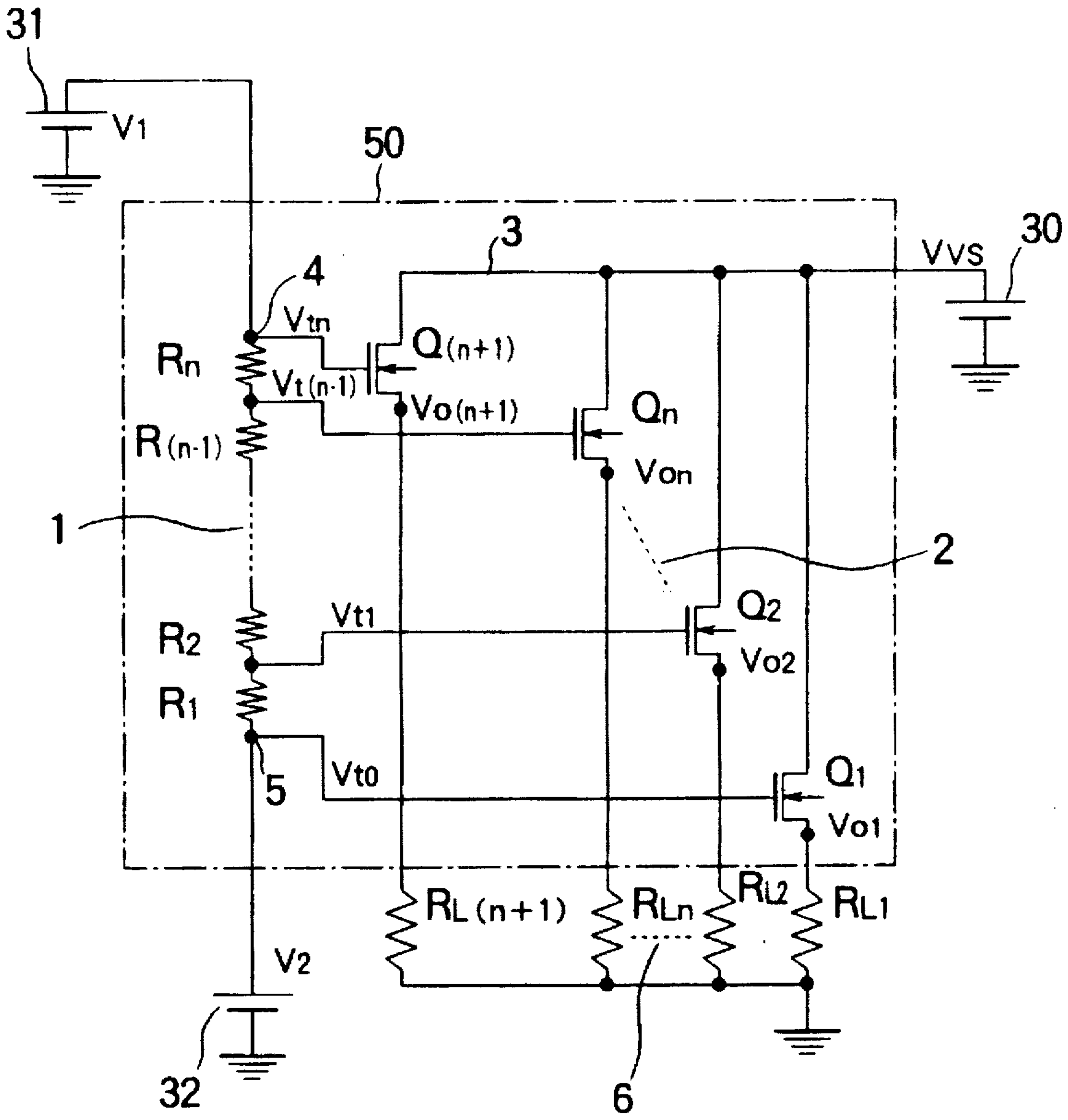
FIG. 1 is a circuit diagram of a multivalued voltage source circuit according to a first embodiment of the present invention.

A multivalued voltage source circuit according to the present invention will now be described.

(First Embodiment)

A multivalued voltage source circuit 50 according to this embodiment comprises: resistors 1 comprised of n series-connected division resistors R1, R2, . . . , R(n−1), and Rn; and MOS transistors 2 comprised of (n+1) MOS transistors Q1, Q2, . . . , Qn, Q(n+1).

The resistors 1 are connected between a first terminal 4 and a second terminal 5.

Voltages V1 and V2 from externally provided voltage sources 31 and 32 are applied to the first terminal 4 and the second terminal 5, respectively.

The resistors 1 divide a voltage applied between the first terminal 4 and the second terminal 5. A voltage at the first terminal 4, a voltage at the second terminal 5, and voltages at (n−1) nodes between division resistors R1 through Rn are applied, as a gate bias voltage, to corresponding MOS transistors Q1 through Q(n+1), respectively.

Each drain electrode of the MOS transistors Q1 through Q(n+1) is connected to a drain terminal 3. A voltage Vvs is given to the drain terminal 3 from an external voltage source 30. (n+1) output voltages Vo1, Vo2, . . . , Von, Vo(n+1) are output from the source electrodes of the MOS transistors Q1 through Q(n+1), respectively.

Substrate regions of NMOS transistors constituting the MOS transistors 2 are shortcircuited with the source electrodes of the MOS transistors, respectively.

FIG. 1 shows a state wherein load resistors 6 comprised of (n+1) load resistors RL1 through RL(n+1) are connected to the MOS transistors Q1 through Q(n+1) for explaining that a multivalued voltage source circuit 50 drives various loads.

One terminal of each of the resistors RL1 through RL(n+1) is connected to the source electrodes of the MOS transistors Q1 through Q(n+1), respectively and other terminals thereof are commonly grounded.

An operation of the multivalued voltage source circuit shown in FIG. 1 will now be described.

For easy understanding, it is assumed that all the division resistors R1 through Rn have the same resistance value and the MOS transistors 2 comprises n-channel MOS transistors Q1 through Q(n+1) (hereinafter referred to as NMOS transistors) each having the same threshold voltage Vth.

Further, it is assumed that the threshold value of each of the NMOS transistors does not change even if the backgate voltage changes.

A supply voltage of the voltage source 31 is denoted as V1; a supply voltage of the voltage source 32, V2; a supply voltage of the voltage source 30, Vvs; and a resistance value of each division resistors R1 through Rn, r. Furthermore, the resistance value of each of the load resistors RL1 through RL(n+1) is assumed to be smaller than the off resistance value of the MOS transistors Q1 through Q(n+1), and larger than the on resistance value of the MOS transistors Q1 through Q(n+1).

Under the above conditions, a potential Vti at the node between the division resistor Ri and the division resistor R(i+1) is expressed by equation (1).

$$Vti=V2-\{(V2-V1)/n\}\cdot i \quad (1)$$

wherein i=0 through n.

In the equation (1), Ro and Rn are assumed to represent the second terminal 5 and the first terminal 4, respectively, and the voltages Vto and Vtn are assumed to represent the voltage V2 of the second terminal 5 and the voltage V1 of the first terminal 4, respectively.

A node between the division resistor Ri and the division resistor R(i+1) is connected to the gate electrode of the MOS transistor Q(i+1). Since the voltage at the gate terminal of the MOS transistor Q(i+1) is Vti and its threshold voltage is Vth, the voltage Vo(i+1) at the source terminal (output terminal) raises up to (Vti−Vth) and thereafter the MOS transistor Q(i+1) is turned off if Vvs is higher than (Vti−Vth). More specifically, the voltage Vo(i+1) at the source terminal (output terminal) of the MOS transistor Q(i+1) is expressed by equation (2).

$$Vo(i+1)=Vti-Vth=V2-\{(V2-V1)/n\}\cdot i-Vth \quad (2)$$

A difference Vdif (=Vo(k)−Vo(k+1)) between output terminal voltage Vo(K) and output terminal voltage Vo(K+1) is expressed by equation (3).

$$Vdif=Vo(k)-Vo(k+1)=(V2-V1)/n \quad (3)$$

In equation (3), if it is assumed that Vvs=12V, Vth=1 V, V1=3V, V2=9V, and n=15, the output voltages result such that Vo1=8.0V, Vo2=7.6V, Vo3=7.2V, Vo4=6.8V, Vo5=6.4V, Vo6=6.0V, Vo7=5.6V, Vo8=5.2V, Vo9 =4.8V, Vo10=4.4V, Vo11=4.0V, Vo12=3.6V, Vo13=3.2V, Vo14=2.8V, Vo15=2.4V, and Vo16=2.0V. As a result, Vdif=0.4V is obtained.

From a single applied power source voltage 12V, 16 types of voltage values can be generated and output each different by 0.4V. The value of the output voltage can arbitrarily be set by adjusting Vvs, Vth, V1, and V2, and n. A DC current value flowing into the resistors 1 can be controlled by changing the resistance value of each division resistors R1 through Rn. Accordingly, power dissipated by the resistors 1 can be set to a desired value as needed.

In the above description, since the resistance values of the division resistors R1 through Rn are assumed to be all identical, the voltage difference Vdif results in a constant value. However, a desired voltage can be produced at each output terminal by differentiating the resistance values of the division resistors R1 through Rn from each other.

In the above description, all the division resistors R1 through Rn have the same resistance value r; all the MOS transistors Q1 through Q(n+1) have the same threshold voltage Vth, and the threshold voltage Vth is not changed with respect to an application of the backgate voltage. A number of semiconductor integrated circuits adapted to these states exist as is described later.

Generally, the same type of MOS transistors on a semiconductor integrated substrate have the same threshold voltage. However, in the case of the semiconductor integrated circuit with a structure wherein each MOS transistor is not mutually electrically separated by a junction separation or a dielectric separation technique, one of p-channel and n-channel MOS transistors uses the common substrate as a substrate region (a channel region). For this reason, it is known that changing the source potential of the MOS transistor using the common substrate as the channel region will change the threshold voltage of the MOS transistor due to the so-called backgate bias effect. Operation of the multivalued voltage source circuit shown in FIG. 1 will now be described from a view point of the above situations.

Figure 2:
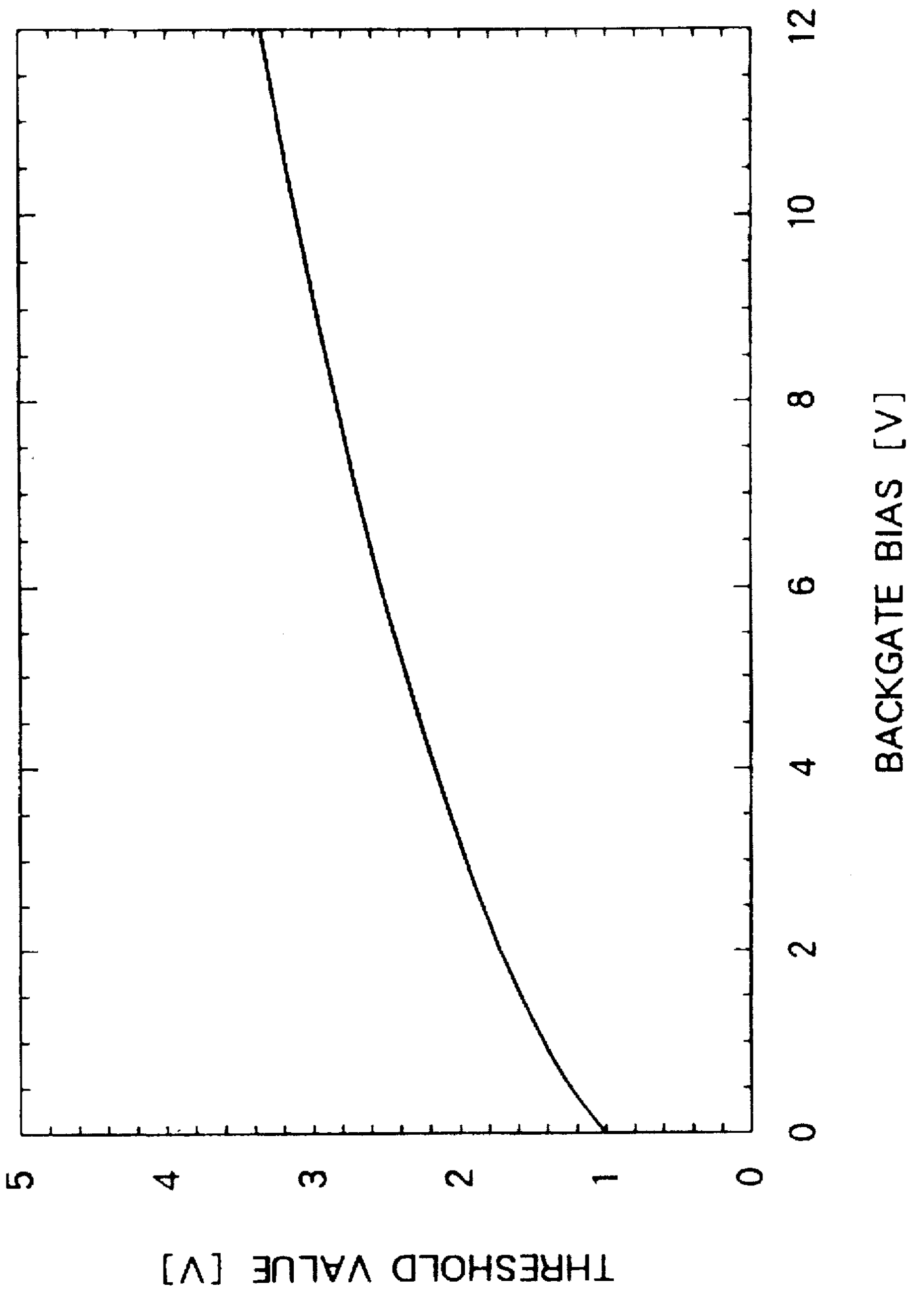
FIG. 2 is a view showing a backgate bias characteristics of an NMOS transistor used in the embodiment of FIG. 1.

A case will be described wherein the MOS transistors 1 shown in FIG. 1 each comprises an n-type MOS transistor on a p-type common silicon substrate and its threshold value has such backgate bias dependency as shown in FIG. 2, with the same voltage value as described above being produced when Vvs=12V.

If the output voltage Vo1 is assumed to be 8.0V, the backgate bias of the NMOS transistor Q1 is also 8V. Referring to FIG. 2, the threshold voltage Vth when the backgate bias voltage of 8V is applied to the NMOS transistor Q1 is 2.83V. Since Vo1=Vto−Vth(bg=8V)=8V, the potential Vto of the gate electrode of the NMOS transistor Q1 may be set to Vto=8+2.83=10.83V in order to obtain the output voltage of 8V.

Similarly, if the output voltage Vo2 is assumed to be 7.6V, the backgate bias voltage of the NMOS transistor Q2 results in 7.6V. Referring to FIG. 2, Vth(bg =7.6V) is 2.77V. Accordingly, the potential Vt1 of the gate electrode of the NMOS transistor Q2 results in Vt1=7.6+2.77=10.37V.

Similarly, if the potentials of the gate electrodes of the MOS transistors Q2 through Q(n+1) are assumed to be such that Vt2=9.91V, Vt3=9.45V, Vt4=8.99V, Vt5=8.52V, Vt6=8.06V, Vt7=7.59V, Vt8=7.12V, Vt9=6.65V, Vt10=6.17V, Vt11=5.69V, Vt12=5.20V, Vt13=4.72V, Vt14=4.22V, and Vt15=3.72V, the same voltages as described above can be produced at each output terminal. Since Vt0=V2, the voltage V2 of the voltage source 32 is set to be 10.83V. Further, since Vt15=V1, the voltage V1 of the voltage source 31 is set to be 3.72V.

Further, if a current flowing into the resistors 1 is denoted as I, the resistance value ri of ith division resistor Ri is set as ri=(Vt(i−1)−Vti)/I. For example, if I=1 mA, then r1=(Vt0−Vt1)/I=460Ω, r2=(Vt1−t2)/I=460Ω are set. Similarly, r3 through r15 are set such that r3=460Ω, r4=460Ω, r5=470Ω, r6=460Ω, r7=470Ω, r8=470Ω, r9=470Ω, r10=480Ω, r11=480Ω, r12=490Ω, r13=480Ω, r14=500Ω, r15=500Ω. As described above, even if the MOS transistors Q1 through Q(n+1) wherein the potential of the source terminal is not identical with the potential of the substrate region (channel region) are used, the output voltage Voi can arbitrarily set by appropriately setting the values of the Vvs, Vt, V1, V2, n and resistance values r1 through rn of the division resistors R1 through Rn.

As described above, a desired voltage value can be produced from the terminal Voi of the circuit shown in FIG. 1 by using the MOS transistors and the resistors integrated in a monolithic fashion.

Figure 3:
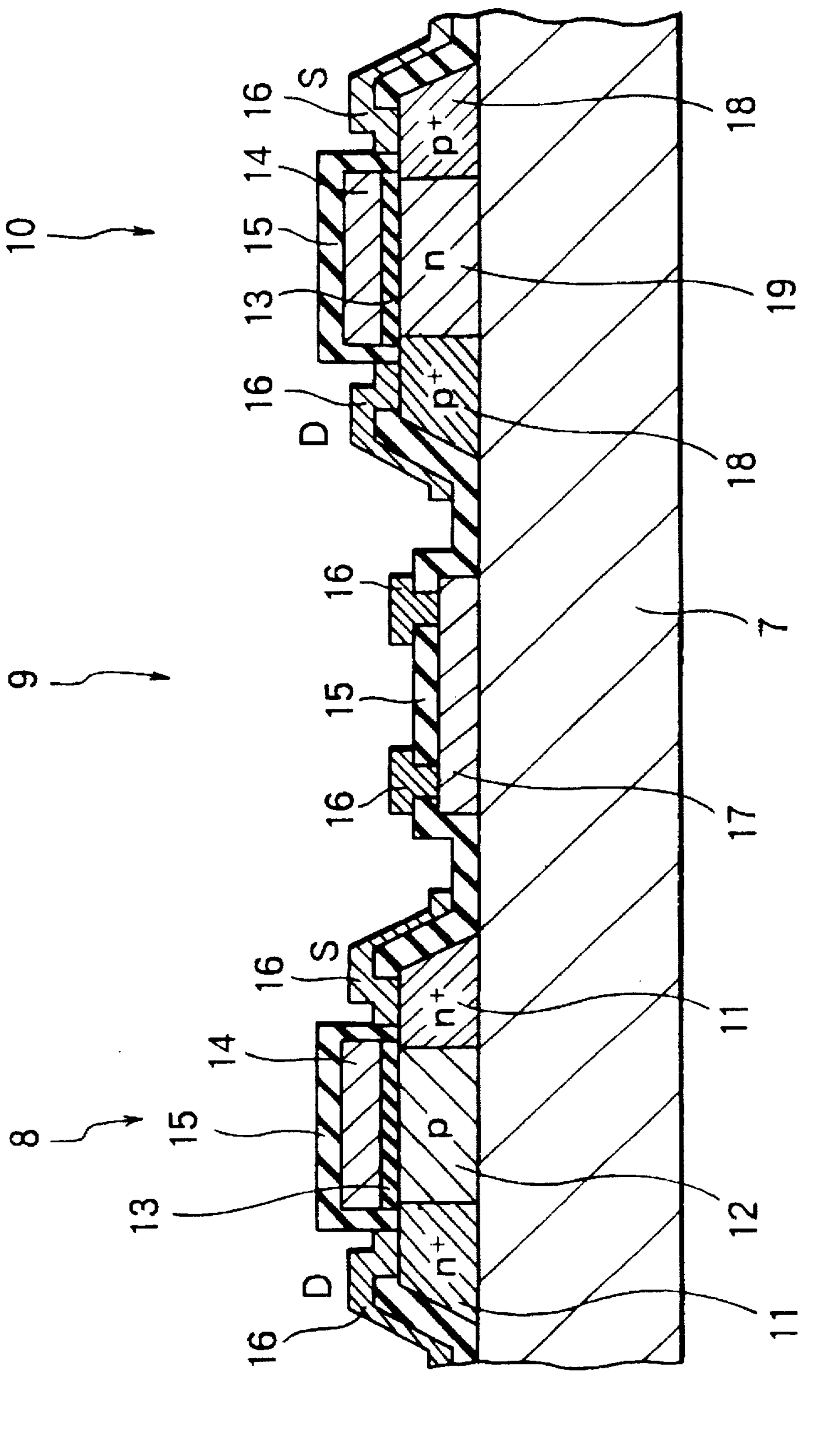
FIG. 3 is a cross sectional view of an integrated semiconductor circuit with a silicon on sapphire structure which can be used for integrating multivalued voltage source circuits according to the first and second embodiments of the present invention.

FIG. 3 shows a cross section of a first example of the semiconductor integrated circuit constituting the multivalued voltage source circuit shown in FIG. 1. The semiconductor integrated circuit shown in FIG. 3 is a semiconductor integrated circuit with a silicon on sapphire structure, and comprises a sapphire substrate 7; and an NMOS transistor 8, a resistor 9 and a PMOS transistor 10 formed on the sapphire substrate 7 in an island fashion while they are insulator-separated.

The NMOS transistor 8 comprises an $n^+$ region serving as a source region and a drain region; a p-type region 12 serving as the channel region; a gate insulating film 13; a gate electrode 14; an interlayer insulating film 15; and a metal wiring 16 forming a source electrode S, and a drain electrode D, etc.

The resistor 9 comprises a resistor layer 17 constituted by a semiconductor layer, a metal layer, etc.; an interlayer insulating film 15; and a metal wiring 16.

The PMOS transistor 10 comprises $p^+$ region 18 serving as the source region and the drain region; an n-type region 19 serving as the channel region; a gate insulating film 13; a gate electrode 14; an interlayer insulating film 15; and a metal wiring 16 forming a source electrode S and a drain electrode D, etc.

Figure 4:
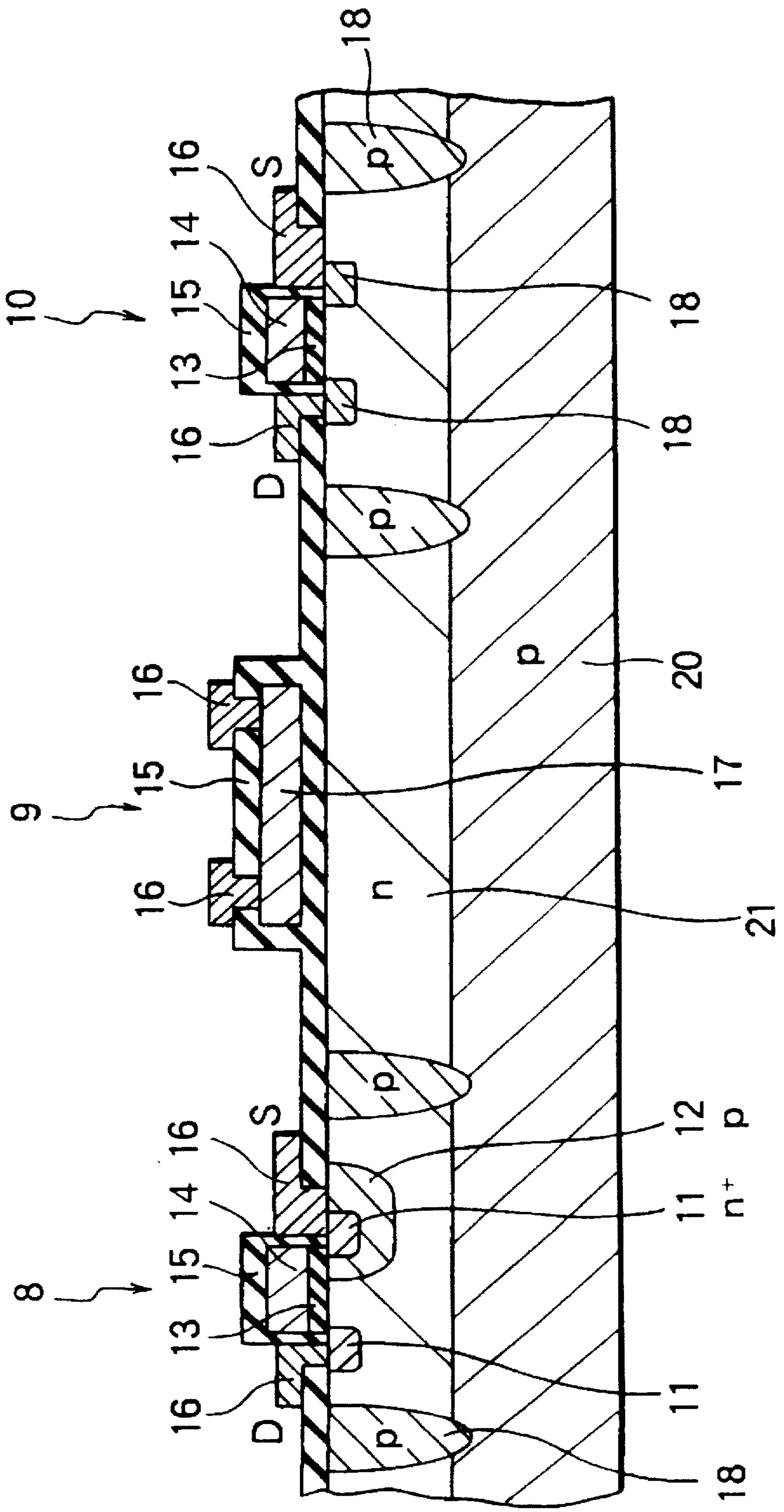
FIG. 4 is a cross sectional view of an integrated circuit with an epitaxial structure which can be used for integrating multivalued voltage source circuits according to the first and second embodiments of the present invention.

FIG. 4 shows a cross section of a second example of the semiconductor circuit of the multivalued voltage source circuit shown in FIG. 1.

The semiconductor integrated circuit shown in FIG. 4 is a semiconductor integrated circuit with an epitaxial structure and comprises a p-type substrate 20; an n-type epitaxial layer 21 formed on the p-type substrate 20; an NMOS transistor 8 junction-separated by the p-type region 18; a resistor 9; and PMOS transistor 10.

The NMOS transistor 8 comprises a p-type region 12 serving as the channel region; an $n^+$ region 11 formed within the p-type region 12 and serving as the source region and the drain region; a gate electrode 14; an interlayer insulating film 15; and a metal wiring 16 serving as the source and drain electrodes.

The resistor 9 is formed by a resistor layer 17 (a semiconductor layer, a metal wire, etc.), the interlayer insulating film 15 and the metal wiring 16.

Figure 5:
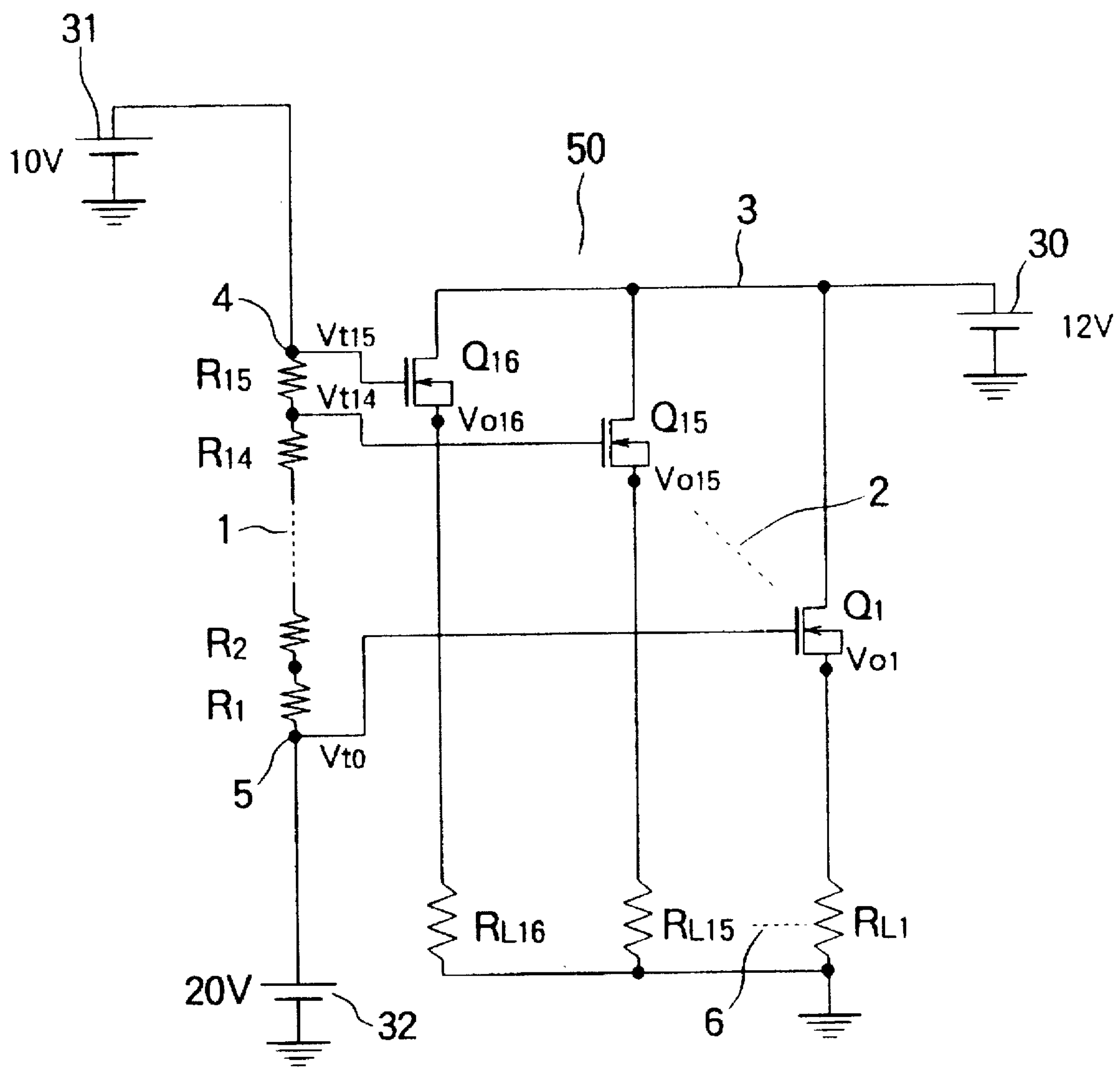
FIG. 5 is a detailed circuit diagram of the multivalued voltage source circuit shown in FIG. 1.

A multivalued voltage source circuit shown in FIG. 5 is implemented by using the NMOS transistor 8 and the resistor 9 (the PMOS transistor is not used in this embodiment) of the semiconductor integrated circuit with structures shown in FIGS. 3 and 4.

The multivalued voltage source circuit shown in FIG. 5 can be implemented by using 16 NMOS transistors each having a gate length of 1 μm, a gate width of 100 μm, a gate oxide film thickness of 25 nm, a threshold voltage of 1V, and an electron mobility of 600 $cm^2/V/s$; 15 resistors each having a resistance value of 100Ω; and a single voltage source of 12V.

Sixteen resistors of 100Ω each are used as the load resistor. The first and second terminals 4 and 5 thereof are applied with 10V and 20V, respectively.

From the output terminals, the voltages of Vol=8.0V, Vo2=7.6V, Vo3=7.2V, Vo4=6.8V, Vo5=6.4V, Vo6=6.0V, Vo7=5.6V, Vo8=5.2V, Vo9=4.8V, Vo10=4.4V, Vo11=4.0V, VO12=3.6V, VO13=3.2V, Vo14=2.8V, Vo15=2.4V, and Vo15=2.0V are produced, respectively.

(Second Embodiment)

In the first embodiment, the MOS transistors 2 are formed by an NMOS. However, the MOS transistors 2 may be formed by a PMOS transistors.

Figure 6:
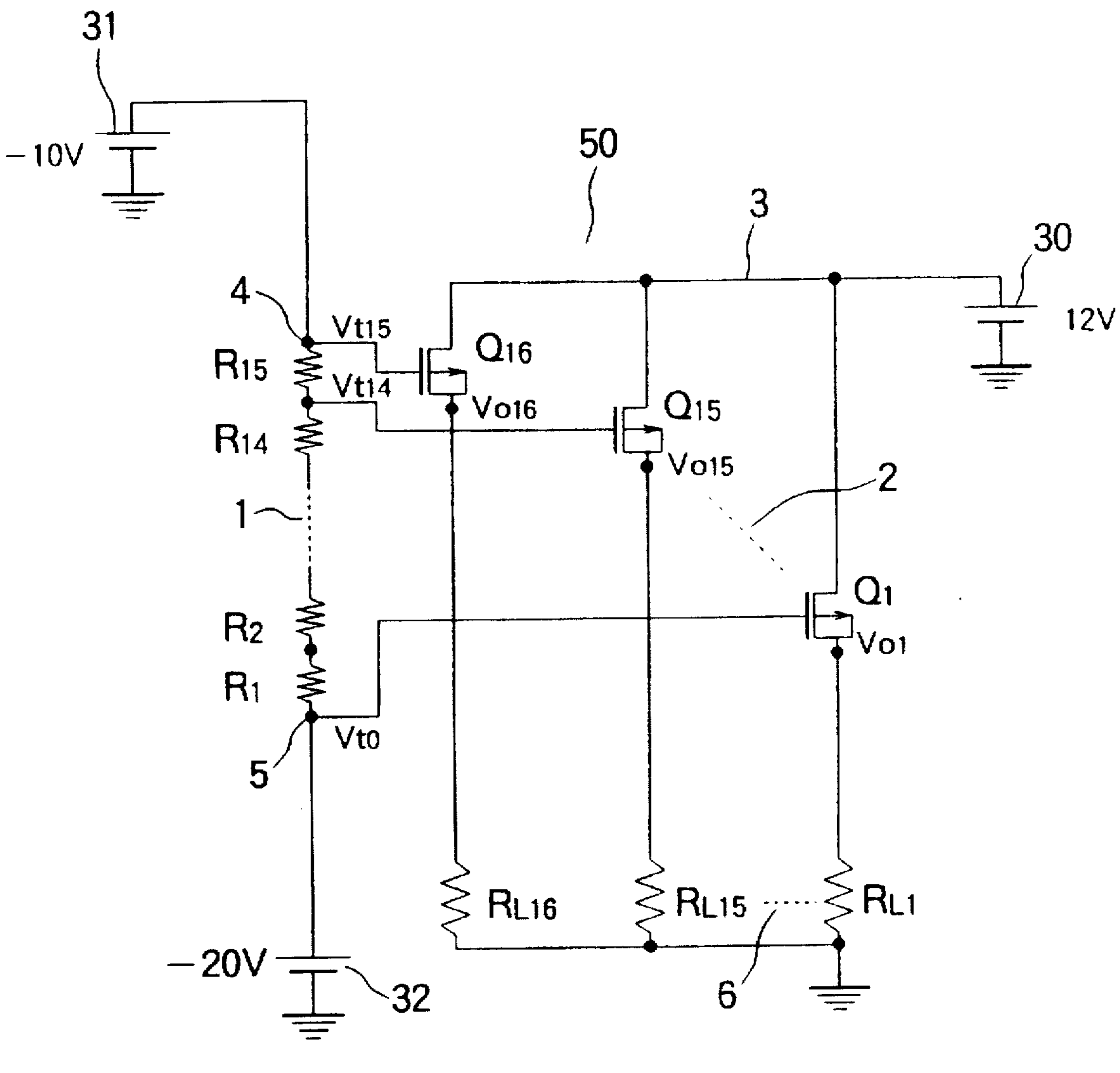
FIG. 6 is a circuit diagram of a multivalued voltage source circuit according to a second embodiment of the present invention.

FIG. 6 shows an arrangement of a multivalued voltage source circuit when the MOS transistors 2 are formed by the PMOS.

The multivalued voltage source circuit shown in FIG. 6 differs from the multivalued voltage source circuit shown in FIG. 5 in that the MOS transistors Q1 through Q15 are formed by the P-channel MOS and the voltages of the voltage sources 30, 31 and 32 have an negative polarity.

The multivalued voltage source circuit shown in FIG. 6 can be implemented by using the PMOS 10 and the resistor 9 shown in FIGS. 3 and 4.

The PMOS transistor 10 shown in FIG. 3 comprises a $p^+$ region 18 serving as the source region and the drain region, an n-type region 19 serving as the channel region; a gate insulating film 13; a gate electrode 14; an interlayer insulating film 15; and a metal wiring serving as the source electrode S and the drain electrode D, etc.

The PMOS transistor 10 shown in FIG. 4 comprises a $p^+$ region 18; an n-type epitaxial region (channel) 21; a gate insulating film 13; a gate electrode 14; an interlayer insulating film 15; and a metal wiring 16.

The multivalued voltage source circuit shown in FIG. 6 is implemented by the PMOS transistor and the resistor of the semiconductor integrated circuit with the structures shown in FIGS. 3 and 4. More specifically, the multivalued voltage source circuit shown in FIG. 6 can be implemented by using 16 PMOS transistors each having a gate length of 1 μm, a gate width of 100 μm, a gate oxide film thickness of 25 nm, a threshold voltage of −1V, a hole mobility of 300 $cm^2/V/S$, 15 resistors each having a value of 100Ω, and a single voltage source of −12V. Sixteen 100 MΩ resistors are used for the load resistor.

The first and second terminals 4 and 5 are applied with −10V and −20V, respectively. From the output terminals, the voltages of Vol=−8.0V, Vo2=−7.6V, Vo3=−7.2V, Vo4=−6.8V, Vo5=−6.4V, Vo6=−6.0V, V07=−5.6V, Vo8=−5.2V, Vo9=−4.8V, Vo10=−4.4V, Vo11=−4.0V, Vo12=−3.6V, Vo13=−3.2V, Vo14=−2.8V, Vo15=−2.4V, and Vo16=−2.0V are output.

Figure 7:
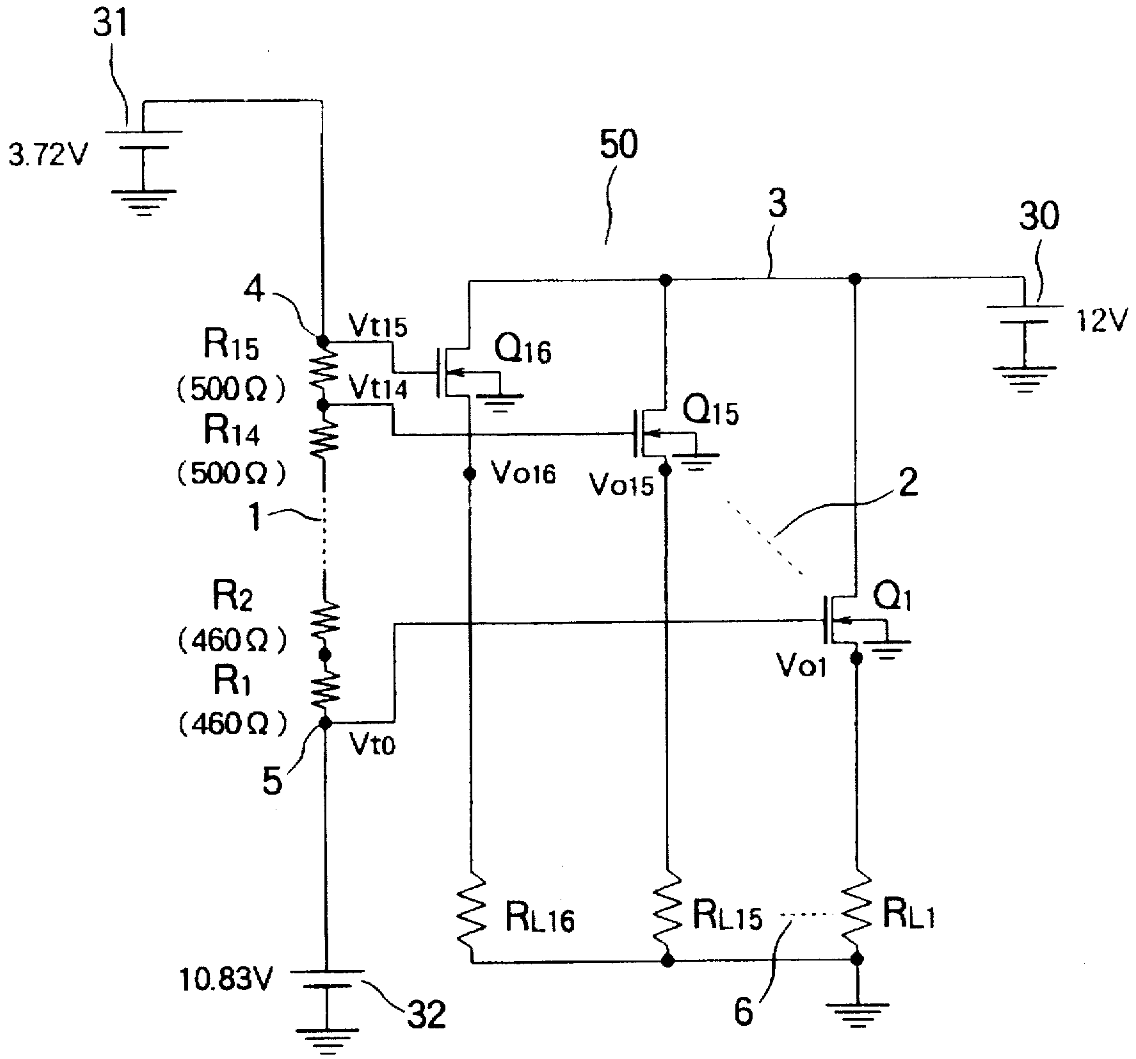
FIG. 7 is a circuit diagram of a multivalued voltage source circuit according to a third embodiment of the present invention.

FIG. 7 shows a circuit diagram according to a third embodiment of the present invention.

According to a multivalued voltage source circuit shown in FIG. 7, MOS transistors Q1 through Q15 are formed by an N-channel MOS transistors and its backgate is grounded. The outputs of the voltage sources 30, 31, and 32 are set to be 12V, 3.72V, and 10.83V, respectively.

Figure 8:
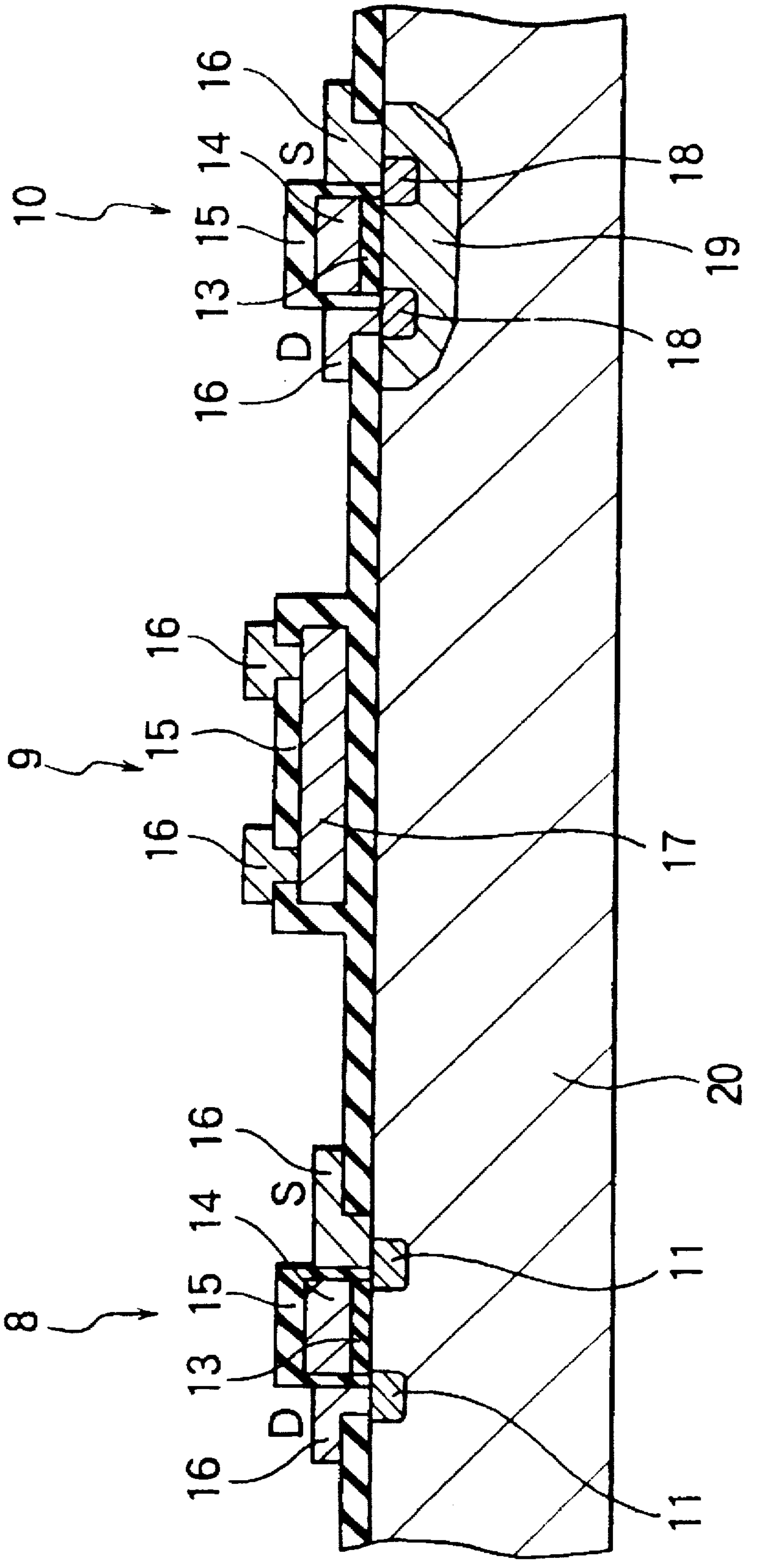
FIG. 8 is a cross sectional view of a CMOS integrated circuit which can be used for implementing the multivalued voltage source circuit according to the third embodiment of the present invention.

FIG. 8 shows a cross section of the semiconductor integrated circuit usable when the multivalued voltage source circuit shown in FIG. 7 is manufactured. The semiconductor integrated circuit shown in FIG. 8 is a CMOS semiconductor integrated circuit with a normal structure and comprises a P-type substrate 20; an NMOS transistor 8; a resistor 9; and a PMOS transistor 10 junction-separated by an n-type well 19.

The NMOS transistor 8 serves as the source and drain regions and comprises an $n^+$ region 11; a p-type substrate region (channel) 20; a gate insulating film 13; a gate electrode 14; an interlayer insulating film 15; and a metal wiring 16 serving as the source and drain electrodes S and D.

The resistor 9 in FIG. 8 comprises a resistor layer 17 constituted by a semiconductor layer and a metal layer, etc.; an interlayer insulating film 15; and a metal wiring 16.

The PMOS transistor 10 comprises an n-type well region 19 formed on a p-type substrate 20 and serving as the n-type well region 19; a $p^+$ region 18 formed in the n-type well region 19 and serving as the source and drain regions; a gate insulating film 13; a gate electrode 14; an interlayer insulating film 15; a metal wiring 16 serving as the source and drain electrodes S and D.

The multivalued voltage source circuit shown in FIG. 7 is implemented by using the NMOS transistor 8 and the resistor 9 of the semiconductor circuit with structure shown in FIG. 8. More specifically, the multivalued voltage source circuit shown in FIG. 7 can be implemented by 16 NMOS transistors each having a gate length of 1 μm, a gate width of 100 μm, a gate oxide film thickness of 25 nm, a threshold voltage of 1V, an impurity density of $10^{16}$ $cm^{-3}$ of p-type substrate, a electron mobility of 600 $cm^2/V/s$; 15 resistors each having a value of 100Ω, and a single voltage source of 12V. Sixteen 100 MΩ resistors are used for the load resistance. The NMOS transistor used has backgate bias dependency shown in FIG. 2.

The first and second terminals 5 and 4 are applied with 10.83V and 3.72V, respectively. A resistance value ri of ith division resistor Ri is such that r1=460Ω, r2=460Ω, r3=460Ω, r4=460Ω, r5=470Ω, r6=460Ω, r7=470Ω, r8=470Ω, r9=470Ω, r10=480Ω, r11=480Ω, r12=390Ω, r13=480Ω, r14=500Ω, and r15=500Ω.

From the output terminals, the voltages of Vo1=8.0V, Vo2=7.6V, Vo3=7.2V, Vo4=6.8V, Vo5=6.4V, Vo6=6.0V, Vo7=5.6V, Vo8=5.2V, Vo9=4.(V, Vo10=4.4V, Vo11=4.0V, Vo12=3.6V, Vo13=3.2V, Vo14=2.8V, Vo15=2.4V, Vo16=2.0V are output, respectively.

According to the above embodiments, since the division resistors R1 through Rn all have the same resistance value, resulting in a constant Vdif. However, desired voltages whose Vdif are different at each output terminal may be output by appropriately setting the resistance values of the division resistors R1 through Rn.

As has been described above, the use of the multivalued voltage source circuits of the above embodiments permits a multivalued voltage with a constant output impedance to be produced with a simple circuit. Furthermore, since a circuit arrangement is simple, a large-size multivalued voltage source circuit for driving various instruments can be integrated in a monolithic fashion. For this reason, various instruments can be manufactured with high performance and low cost.

What is claimed is:

1. A voltage circuit, comprising:

a first terminal for receiving a first external voltage;

a second terminal for receiving a second external voltage;

n resistors coupled with respect to one another between said first terminal and said second terminal to form n−1 inter-resistor nodes, n being an integer greater than one;

n+1 MOS transistors, each having a respective drain, a source and a gate, each drain being connected to a third terminal for receiving a third external voltage, the gate of a first of said n+1 MOS transistors being connected to said first terminal, the gate of a second of said n+1 MOS transistors being connected to said second terminal, and the gate of each of the remaining n−1 of said n+1 MOS transistors being connected to a corresponding one of the inter-resistor nodes, so that the source of each of said n+1 MOS transistors outputs a respective voltage corresponding to a voltage on its gate from its corresponding one of the inter-resistor nodes, wherein each of said n+1 MOS transistors includes an insulating substrate, a first semiconductor region on said insulating substrate having side surfaces, the first semiconductor region comprising a first semiconductor type, a second and a third semiconductor region of a second semiconductor type formed on said insulating surface, the second and third semiconductor regions being connected to corresponding ones of said side surfaces, an insulating film on said first semiconductor region, a first electrode on said insulating film to form the gate of the MOS transistor, a second electrode connected to said second semiconductor region to form the source of the MOS transistor, and a third electrode connected to said third semiconductor region to form the drain of the MOS transistor, and wherein each of said resistors includes a resistor layer on said insulating substrate, a fourth electrode on said resistor layer, a fifth electrode on said resistor layer and separated from said fourth electrode, each of said fourth and fifth electrodes being connected to a respective one of the inter-resistor nodes.

2. A voltage source circuit according to claim 1, wherein said n resistors each have the same resistance value relative to one another.

3. A voltage source circuit, comprising:

a first terminal for receiving a first external voltage;

a second terminal for receiving a second external voltage;

n resistors serially coupled between said first terminal and said second terminal to form n−1 resistor connection nodes, where n is an integer larger than one;

n+1 MOS transistors, each having a source, a drain, and a gate, each drain being connected to a third terminal for receiving a third external voltage, the gate of a first of said n+1 MOS transistors being connected to said first terminal, the gate of a second of said n+1 MOS transistors being connected to said second terminal, and the gates n−1 of said n+1 MOS transistors being connected in a one-to-one correspondence to said n−1 nodes resistors, so that the source of each of said n+1 MOS transistors outputs a corresponding output voltage.

wherein each of said MOS transistors includes a semiconductor layer of a first semiconductor type, a first semiconductor region of a second semiconductor type formed in said semiconductor layer, a second semiconductor region of said second semiconductor type formed in said semiconductor layer and separated from said first semiconductor region, a first insulating film on said semiconductor layer between said first and second semiconductor regions, a first electrode on said first insulating film to form the gate of the MOS transistor, a second electrode connected to said second semiconductor region to form the source of the MOS transistor, and a third electrode connected to the second semiconductor region to form the drain of the MOS transistor, and wherein each of said resistors includes a second insulating film on said semiconductor layer, a resistor layer on said second insulating film, a fourth electrode on said resistor layer, a fifth electrode on said resistor layer separated from said fourth electrode, wherein said fourth and fifth electrodes are connected to a respective one of said resistor connection nodes.

4. A circuit according to claim 3, wherein said resistors have a respective resistance value that is dependent on a back bias.

5. A voltage source circuit, comprising:

a first terminal for receiving a first external voltage;

a second terminal for receiving a second external voltage;

a semiconductor substrate formed of a first semiconductor type;

an epitaxial layer formed of a second semiconductor type on said semiconductor substrate;

n resistors formed on said epitaxial layer, said n resistors being serially coupled between said first terminal and said second terminal to form n−1 resistor connection nodes, where n is an integer larger than one;

n+1 MOS transistors, each having a channel, a source and a drain arranged within said epitaxial layer, and a gate, each drain being connected to a third terminal for receiving a third external voltage, the gate of a first of said n+1 MOS transistors being connected to said first terminal, the gate of a second of said n+1 MOS transistors being connected to said second terminal, and the gates of n−1 of said n+1 MOS transistors being connected in a one-to-one correspondence to said n−1 nodes resistors, so that the source of each of said n+1 MOS transistors outputs a corresponding output voltage, wherein each of said MOS transistors comprises a first semiconductor region of said first semiconductor type within said epitaxial layer which forms the channel, a second and a third semiconductor region, each being a second semiconductor type implanted in said epitaxial layer and separated from one another by a length of said first semiconductor region, said second and third semiconductor regions forming the source and the drain of the transistor, respectively, a first insulating film and a conductor arranged in order above the first semiconductor region to form the gate of the transistor, and a first and a second isolation junction region implanted in said epitaxial layer adjacent to said second and third semiconductor regions, respectively, and wherein each of said resistors includes a second insulating film on said epitaxial layer, a resistor layer on said second insulating film, a first electrode on said resistor layer, a second electrode on said resistor layer separated from said first electrode, wherein said first and second electrodes are connected to a respective one of said resistor connection nodes.

6. A circuit according to claim 5, wherein said resistors have a respective resistance value that is dependent on a back bias.

* * * * *

UNITED STATES PATENT AND TRADEMARK OFFICE

CERTIFICATE OF CORRECTION

PATENT NO. : 5,739,593
DATED : April 14, 1998
INVENTOR(S) : Hiroshi Hayama

It is certified that error appears in the above-identified patent and that said Letters Patent is hereby corrected as shown below:

On the title page, item: [63], after"... No.23,1994." insert--NOW ABANDONED--.

Column 1, line 6, after"...Nov. 23, 1994." insert--NOW ABANDONED--.

Signed and Sealed this

Sixth Day of October, 1998

Attest:

BRUCE LEHMAN

*Attesting Officer*

*Commissioner of Patents and Trademarks*